United States Patent [19]
McCutcheon et al.

[11] Patent Number: 5,560,587
[45] Date of Patent: Oct. 1, 1996

[54] GATE VALVE SLEEVE

[75] Inventors: Andrew J. McCutcheon, Camas, Wash.; Jeffrey M. Bowman, Portland, Oreg.; David L. Gambetta, Vancouver, Wash.

[73] Assignee: Technaflow, Inc., Vancouver, Wash.

[21] Appl. No.: 261,344

[22] Filed: Jun. 16, 1994

Related U.S. Application Data

[63] Continuation-in-part of Ser. No. 123,421, Sep. 16, 1993, Pat. No. 5,338,006.

[51] Int. Cl.$^6$ ..................................................... F16K 3/16
[52] U.S. Cl. ........................................... 251/327; 251/358
[58] Field of Search .................................. 251/327, 328, 251/358, 362

[56] References Cited

U.S. PATENT DOCUMENTS

| | | | |
|---|---|---|---|
| 2,626,776 | 1/1953 | Martineau | 251/167 |
| 2,985,422 | 5/1961 | Anderson et al. | 251/172 |
| 3,333,816 | 8/1967 | Williams et al. | 251/327 |
| 3,722,857 | 3/1973 | Townsend | 251/203 |
| 4,257,447 | 3/1981 | Clarkson | 137/375 |
| 4,515,347 | 5/1985 | Sitton et al. | 251/328 |
| 4,688,597 | 8/1987 | Clarkson et al. | 251/327 X |
| 4,773,627 | 9/1988 | King et al. | 251/328 |
| 4,846,442 | 7/1989 | Clarkson et al. | 251/328 |
| 4,911,407 | 3/1990 | Paul, Jr. | 251/172 |
| 5,271,426 | 12/1993 | Clarkson et al. | 137/375 |

OTHER PUBLICATIONS

Bulletin 27–25, "KGD Model Wafer–Type Knife–Gate Valves," The Clarkson Company, Sep., 1991.
Lit. No. 27–70, "Installation and Maintenance Instructions, Clarkson Series KGD Valve," The Clarkson Company, Jun., 1992.

*Primary Examiner*—John C. Fox
*Attorney, Agent, or Firm*—Stoel Rives LLP

[57] ABSTRACT

A gate valve sealing unit includes first and second annular seal members that are attached to a main body structure within a passageway that receives and is selectively occluded by a gate. The first and second seal members include first and second rigid mounting hubs to which are mounted first and second annular elastomer sleeves, respectively. Each elastomer sleeve has a continuous lip section and plural axially spaced cavities, the lip sections of the first and second sleeves engaging peripheral margins on opposite sides of the gate when it occludes the passageway and engaging each other otherwise. The first and second mounting hubs include axially outward radial flanges that extend from the respective first and second sides of the main body structure.

16 Claims, 5 Drawing Sheets

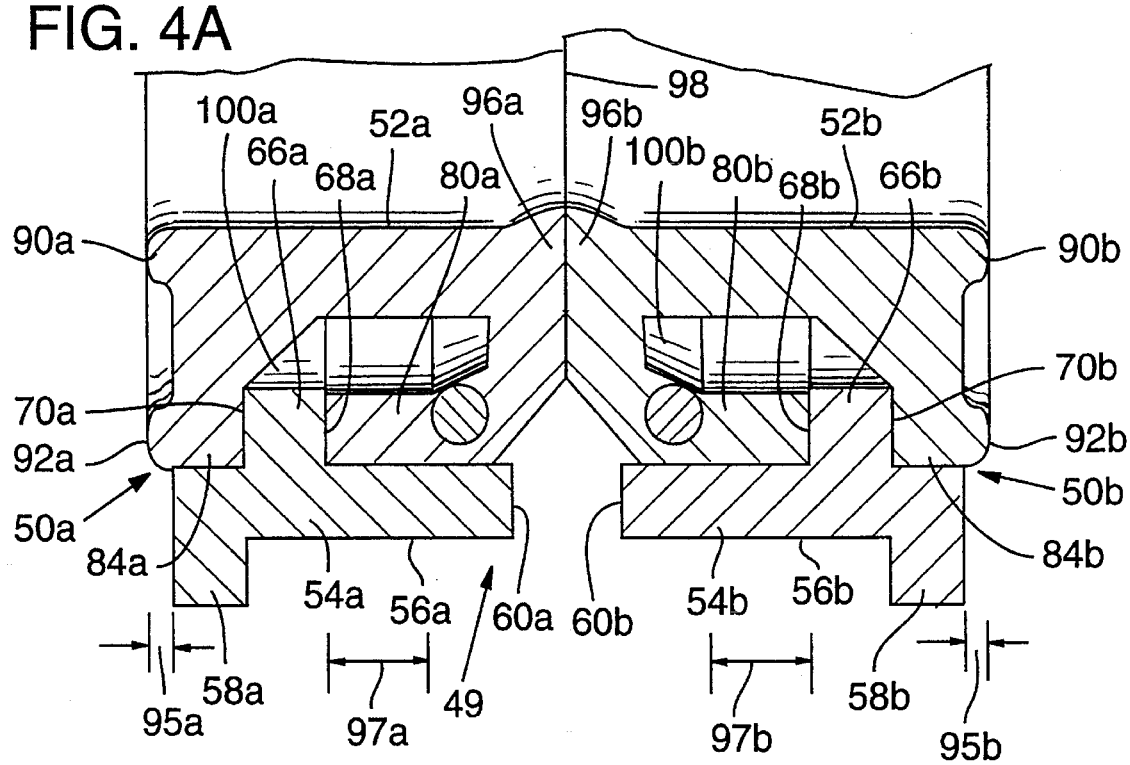
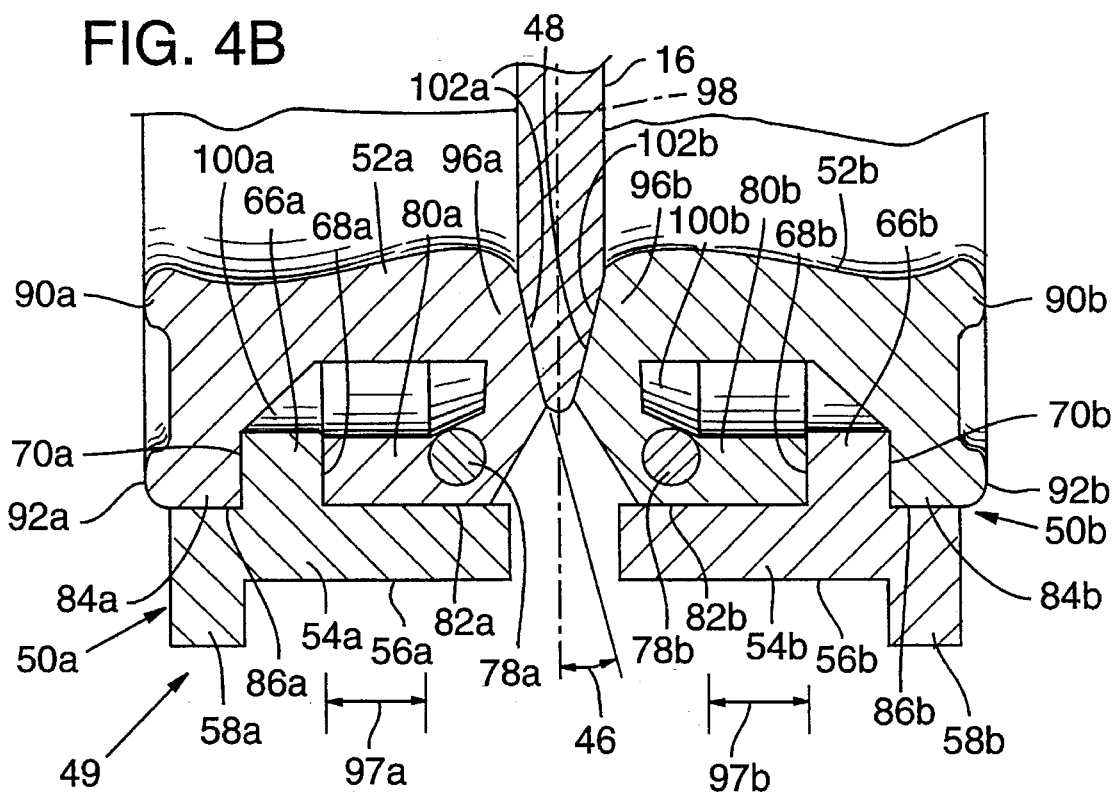

GATE VALVE SLEEVE

RELATED APPLICATION

This application is a continuation-in-part of U.S. patent application No. 08/123,421, filed Sep. 16, 1993, now U.S. Pat. No. 5,338,006.

TECHNICAL FIELD

The present invention relates to gate valves having a main body structure with a passageway that is selectively occluded by a gate and, in particular, to providing a seal between the main body structure and the gate.

BACKGROUND OF THE INVENTION

Gate valves are used to control the flow of various fluids carried inside tubular conduits or pipes. A gate valve typically includes a main body structure with a passageway positioned between and coupling a pair axially-aligned conduits that are bolted to opposite sides of the main body structure. A flat, fluid-impermeable gate with a pair of opposed, substantially planar faces is slidable into the passageway through a slot in the main body structure to selectively occlude the passageway and thereby close the valve.

Gate valves that are used to control the flow of fluids include a seal between the gate and the main body structure to prevent the fluid from leaking, either from the valve or across it when closed. For fluids that include a mixture of solids, referred to as a slurry, an adequate seal between the gate and the main body structure can be difficult to achieve. Slurries arise in many harsh industrial environments, such as wood pulp processing and paper manufacturing, various types of mining including coal and phosphates, and bottom ash removal systems for power station smokestack scrubbers. The solids in such slurries can clog, coat, or damage a seal in many gate valves and thereby allow the fluid to leak.

One bidirectional gate valve seal, described in U.S. Pat. No. 4,846,442 of Clarkson et al., includes a pair of opposed solid resilient sleeve units that compressibly engage each other when the valve is open and engage opposite sides of the gate when the valve is closed. A stiffening ring bonded to each sleeve unit engages a rigid locking ring to hold the sleeve unit in place.

Such a gate valve seal suffers from several disadvantages. The solid resilient sleeve units can be difficult to displace when closing the valve because the design does not include a way to eliminate overcompression of the sleeve from the flange-raised face surfaces of the mating conduit, thereby making the valve difficult to operate. Moreover, pressure against the gate in a valve closed position can displace the resilient sleeve unit on the downstream side and allow a leak between the gate and the upstream resilient sleeve unit.

SUMMARY OF THE INVENTION

An object of the present invention is, therefore, to provide a bidirectional gate valve with an improved seal unit.

Another object of this invention is to provide such a gate valve in which the seal unit allows easy operation of the valve.

A further object of this invention is to provide such a gate valve in which the seal unit prevents the valve from leaking, when fully open or fully closed and under pressure.

The present invention includes a gate valve having a main body structure to which respective first and second axially aligned conduits are attachable, and an opening that defines a passageway between the conduits. A gate is positionable to occlude the passageway and extends from the main body structure in a direction that is transverse to the axis of the first and second conduits, the gate having opposing sides that each have a peripheral margin.

The valve includes a seal unit having first and second annular sealing members that are set within the main body structure to receive the peripheral margins of the gate when it occludes the passageway. The first and second sealing members include first and second rigid, annular mounting hubs to which respective first and second annular elastomer sleeves are mounted.

Each elastomer sleeve has a continuous major lip section and plural angularly-spaced cavities, the lip sections of the first and second sleeves engaging the peripheral margins of the gate when it occludes the passageway and engaging each other otherwise. The mounting hubs include radially outward flanges that extend axially outward from the main body structure. The mounting hub flanges engage the flanges of conduits coupled to the valve body to prevent overcompression and a consequent excessive wear of the elastomer sleeves, and to prevent difficult operation of the valve.

The mounting hubs also include facing edges that are spaced apart also to support the peripheral margins of the gate when it occludes the passageway and is under pressure, thereby preventing undercompression of the upstream sleeve and consequent leakage. The plural cavities facilitate displacement of the elastomer sleeves when they engage the gate, thereby allowing easy operation of the valve and enhancing durability of the elastomer sleeves.

Additional objects and advantages of the present invention will be apparent from the detailed description of a preferred embodiment thereof, which proceeds with reference to the accompanying drawings.

BRIEF DESCRIPTION OF THE DRAWINGS

FIGS. 4A and 4B are enlarged partial sectional side views emphasizing the seal unit in the valve of FIG. 1 and showing the valve in its respective open and closed positions.

DETAILED DESCRIPTION OF A PREFERRED EMBODIMENT

Figure 1:
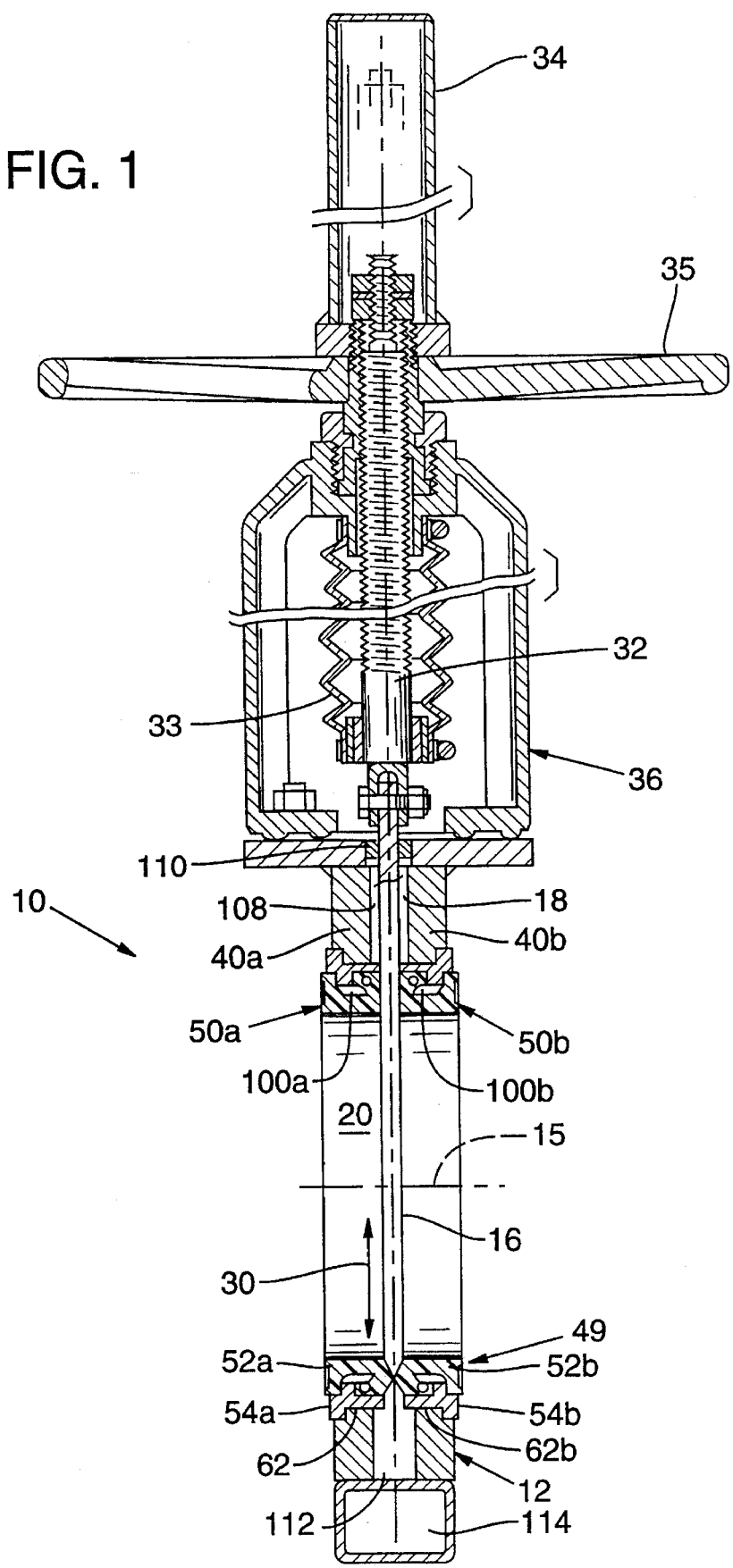
FIG. 1 is a fragmentary sectional side view of a gate valve employing a seal unit of the present invention.
Figure 2:
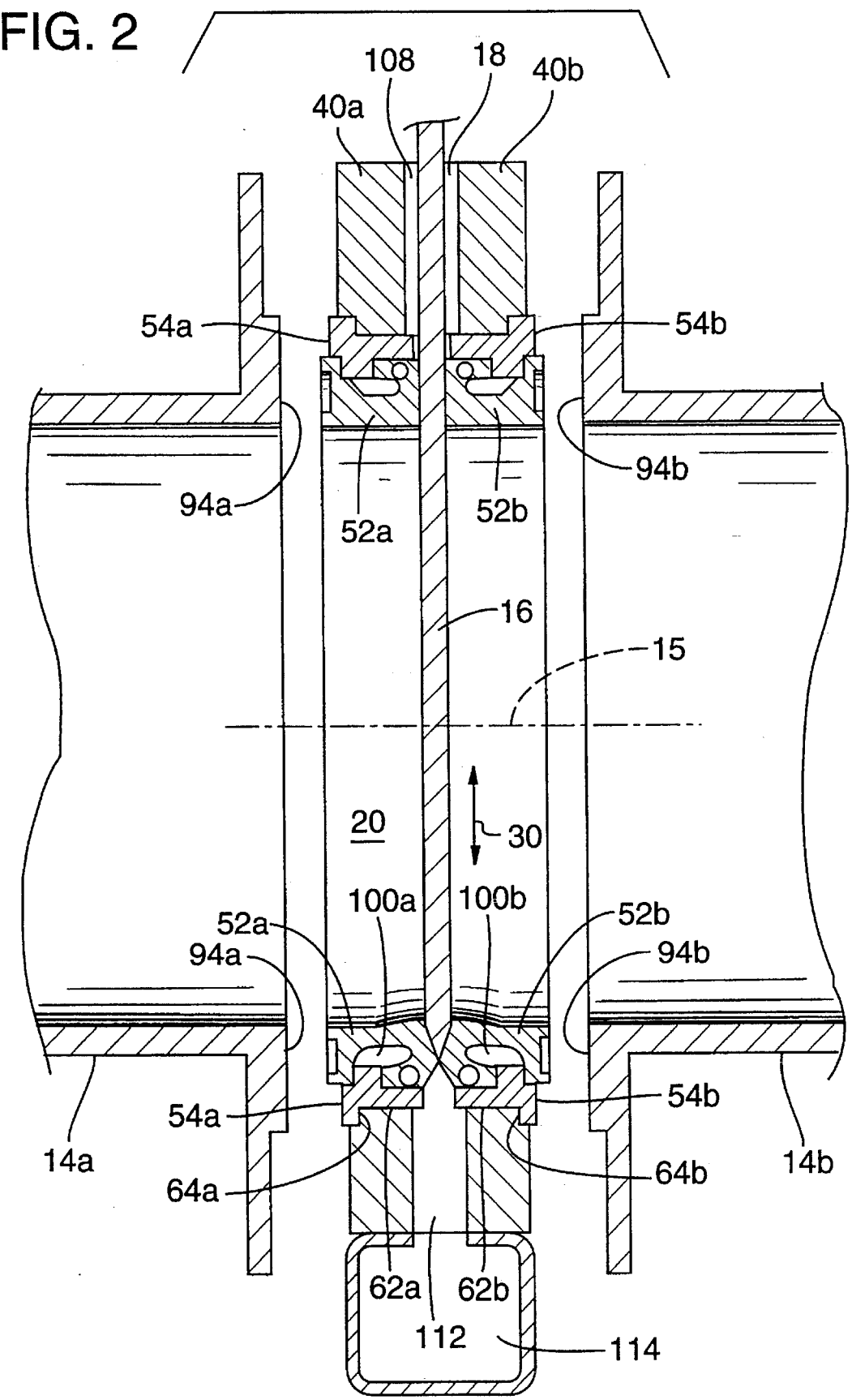
FIG. 2 is an enlarged partial side view of the seal unit of FIG. 1 positioned between a pair of conduits.
Figure 3:
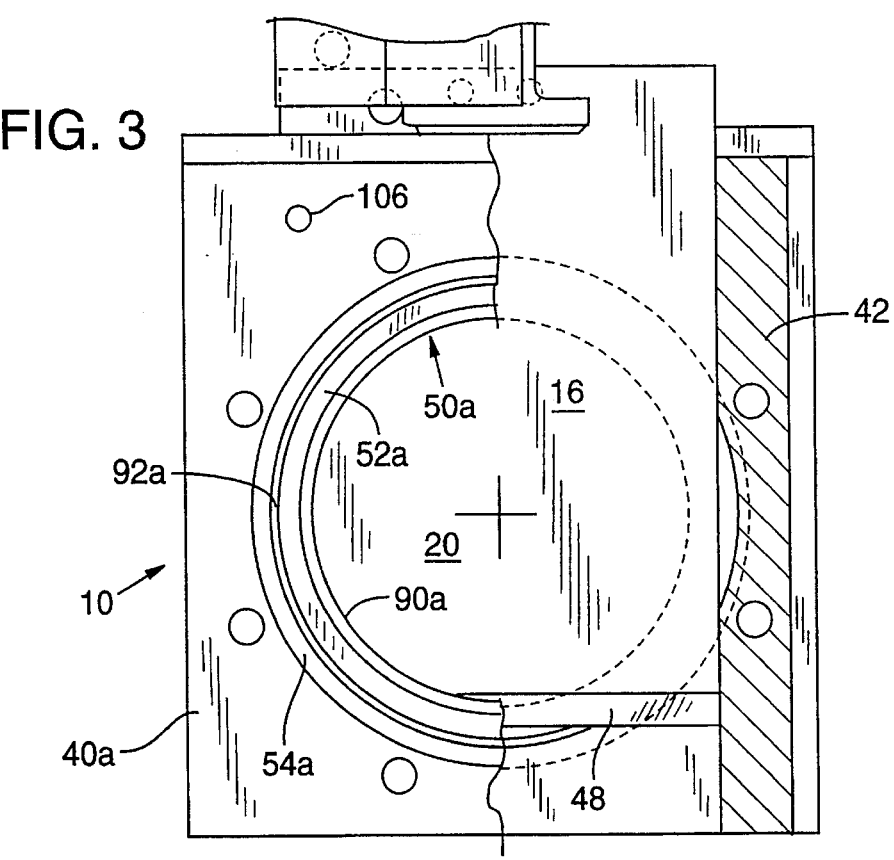
FIG. 3 is a partial front elevation showing a main body section and gate of the valve of FIG. 1.

With reference to FIGS. 1, 2, and 3, a bidirectional knife gate valve 10 having a main body structure 12 is positioned between a pair of axially aligned conduits 14a and 14b for carrying a fluid or slurry along an axis 15. A flat, fluid-impermeable gate 16 is positioned within a slot 18 passing through main body structure 12.

Gate 16 is slidable through slot 18 to selectively occlude an interior region or passageway 20 of valve 10. Passageway 20 extends between and couples conduits 14a and 14b. Occlusion of passageway 20 with gate 16 functions to close valve 10. Removing gate 16 from passageway 20 functions to open gate valve 10. Gate 16 is slidable through slot 18 in directions 30 that are transverse, preferably perpendicular, to axis 15.

Movement of gate 16 through slot 18 is controlled by a conventional threaded stem 32 positioned within an impermeable, resilient boot 33 and cap 34, and coupled to handwheel unit 35, which are secured to an upper portion 36 of main body structure 12. It will be appreciated that movement of gate 16 through slot 18 may be controlled by other conventional mechanisms such as, for example, pneumatic, hydraulic, or electromechanical mechanisms.

Main body structure 12 includes a pair of opposed, substantially identical body halves 40a and 40b that are welded or bolted together with a pair of flat spacers 42 (only one shown in FIG. 3) positioned between the sides thereof. Body halves 40a and 40b may be fabricated or cast metal, preferably steel, or any other suitable material including composites. Spacers 42 are formed of a rigid material, such as stainless steel or mild steel, that are selected according to the temperature and chemical characteristics of the slurry. Spacers 42 separate body halves 40a and 40b to form slot 18 through which gate 16 is movable to selectively open or close gate valve 10.

With reference also to FIGS. 4A and 4B, a seal unit 49 includes substantially similar seal members 50a and 50b positioned within respective body halves 40a and 40b and cooperating to seal gate valve 10 whether it is open or closed. Seal members 50a and 50b are positioned and sized to provide valve 10 with full flow bore when it is completely open. Seal members 50a and 50b have substantially similar components that are distinguished by the suffices "a" and "b". The following description is directed to seal member 50a, but is similarly applicable to seal member 50b.

Seal member 50a includes a resilient, annular, elastomer sleeve 52a and a substantially rigid annular hub 54a that are press fit together. Hub 54a includes a substantially flat circumferential surface 56a with a radially (outward flange 58a) positioned opposite an axially inward support face 60a. Surface 56a seats against an interior surface 62a of body half 40a; flange 58a seats in and projects from a recess 64a in an axially outer face of body half 40a; and support face 60a extends into slot 18. Elastomer sleeve 52a is preferably formed of a molded soft, resilient material such as natural rubber, chlorobutyl, or neoprene with additives such as wax or Teflon™ included to improve lubricity. Hub 54a is preferably formed of a rigid material of low compressibility such as polyamide, available as Nylatron GSM™ from Polymer Corporation of Reading, Pa., ethylene-chlorotrifluroethylene, available as Halar™ from Ausimont of Morristown, N.J., or stainless steel of the types 304 or 316.

Gate 16 may be metal plate, plastic, or a composite material, with a taper 46 (FIG. 4B) of 7°–12°, preferably 10°, ground (i.e., for a metal plate) along both sides of leading edge 48. The angle of taper 46 on leading edge 48 of gate 16 is selected to be sufficiently large to prevent leading edge 48 from cutting elastomer sleeves 52a and 52b. The angle is sufficiently small to allow easy movement of gate 16 between sleeves 52a and 52b and to minimize leakage during movement of gate 16.

A radially inwardly projecting ridge 66a having opposed faces 68a and 70a is press fit into a radially inward recess 76a (FIG. 5) in elastomer sleeve 52a. A metal retaining ring 78a is embedded in sleeve 52a in a rim segment 80a that engages face 68a and an adjacent axially inward ledge 82a of hub 54a. Retaining ring 78a is preferably of mild steel because of low cost and superior adhesion to sleeve 52a, but could alternatively be of stainless steel for use in a corrosive environment. A rim segment 84a of sleeve 52a engages face 70a and an adjacent axially outward ledge 86a of hub 54a. A pair of axially outwardly projecting annular ridges 90a and 92a function as a gasket for engaging a flange surface 94a of conduit 14a to hold sleeve 52a in place and provide a seal between conduit 14a and body half 40a. Preferably, ridges 90a and 92a project beyond flange 58a by a distance 95a (FIG. 4A), for example, of about ⅛ inch (3.2 mm) for an 8 inch (20 cm) valve 10 before coupling of conduit 14a, and flange 58a projects from axially outer face of body half 40a by a similar distance.

Rim segment 80a has a large thickness 97a that allows rim segment 80a to be compressed by relatively large amounts. As a result, sleeve 52a is comparatively pliable and capable of maintaining a good seal against gate 16, even along the lower portion of passageway 20 as gate 16 is moved. Sleeve 52a and hub 54a may, therefore, be formed with rotational symmetry so that seal member 50a can be installed more easily without regard to rotational orientation. In contrast, some gate valve seals with less pliability require a groove along the lower portion of the passageway to improve sealing capability. However, such seals must be installed with a rotationally specific orientation, thereby making installation relatively difficult.

The hardness of elastomer sleeve 52a is a parameter that may affect valve performance. A sleeve 52a of insufficient hardness may cause it to misalign at operating pressures and extrude out of valve body 12. It has been empirically determined that a sleeve 52a of excessive hardness may not seal against gate 16 and thus take a compression set that would result in seal failure. For a preferred 8 inch (20 cm) diameter passageway 20 of a valve 10, an elastomer sleeve 52a with a hardness of 67+0/–2 Durometer performs correctly at design pressures. The proper hardness figure may be different for valves of different passageway diameters.

Figure 5:
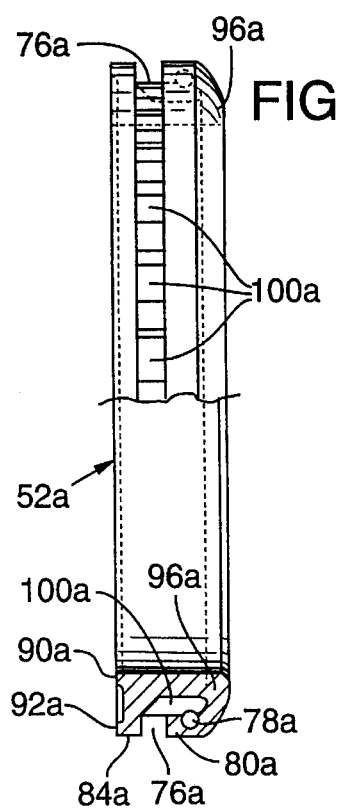
FIG. 5 is a partial sectional side elevation of an elastomer sleeve of the present invention.
Figure 6:
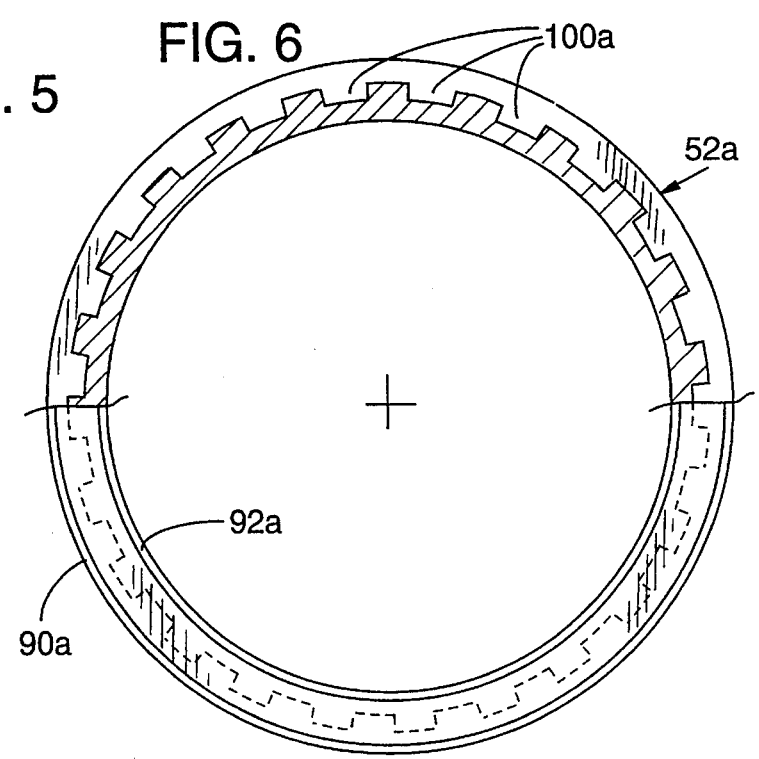
FIG. 6 is a partial sectional front elevation showing the elastomer sleeve of FIG. 5.

With reference also to FIGS. 5 and 6, elastomer sleeve 52a further includes an axially inwardly projecting major lip 96a that extends under compression to a valve centerline 98. Multiple angularly spaced cavities 100a extend radially inward from recess 76a of elastomer sleeve 52a. For example, an 8 inch (20 cm) valve 10 includes 24 cavities 100a that are angularly distributed uniformly around sleeve 52a and are canted axially inwardly. The number and size of cavities 100a relates to the volume of sleeve 52a displaced by gate 16 in the closed position.

Major lips 96a and 96b of respective sleeves 52a (FIG. 4B) and 52b compress against peripheral margins 102a and 102b (FIG. 4B) on opposite sides of gate 16 whenever it occludes passageway 20. In the absence of gate 16, major lips 96a and 96b engage each other to seal passageway 20 from atmosphere. Support faces 60a and 60b are spaced apart from respective peripheral margins 102a and 102b to support gate 16 and prevent it when under pressure on one side from over-compressing the downstream one of elastomer sleeves 52a and 52b. As a result, leakage around the corresponding upstream one of seal units 50a and 50b is reduced and the durability of elastomer sleeves 52a and 52b is enhanced.

Cavities 100a and 100b facilitate displacement of elastomer sleeves 52a and 52b when they engage gate 16 to allow easy flexure of sleeves 52a and 52b, thereby providing easier operation of valve 10 and improved durability for seal units 50a and 50b. Retaining rings 78a and 78b function to improve the coupling between elastomer sleeves 52a and 52b and hubs 54a and 54b, respectively. The combination of molding retaining rings 78a and 78b into respective rim segments 80a and 80b and holding them in place against hubs 54a and 54b minimize the tendency of sleeves 52a and 52b to pull from hubs 54a and 54b. This prevents misalignment of and damage to sleeves 52a and 52b.

Preferred valve 10 also includes grease point 106 allows grease to be introduced into a grease chamber 108 for lubricating elastomer sleeves 52a and 52b to prolong sleeve life and facilitate ease of operation. A hard wiper 110 together with conventional packing material is positioned within upper portion 36 and functions to seal grease within chamber 108. Wiper 110 also scrapes material from gate 16 as it slides through wiper 110. Wiper 110 may be formed of various materials according to the temperature and chemical characteristics of the slurry, such as polyethylene available as UHMW™ from Hoeshst Celanese of Chatham, N.J., Teflon™ (i.e., fluorinated ethylene propylene) available from Dupont, or of stainless steel of types 304 or 316. A clean-out area 112 is connected to a drip pan 114 that collects any fluid that might incidentally leak between gate 16 and seal units 50a and 50b.

Figure 7A:
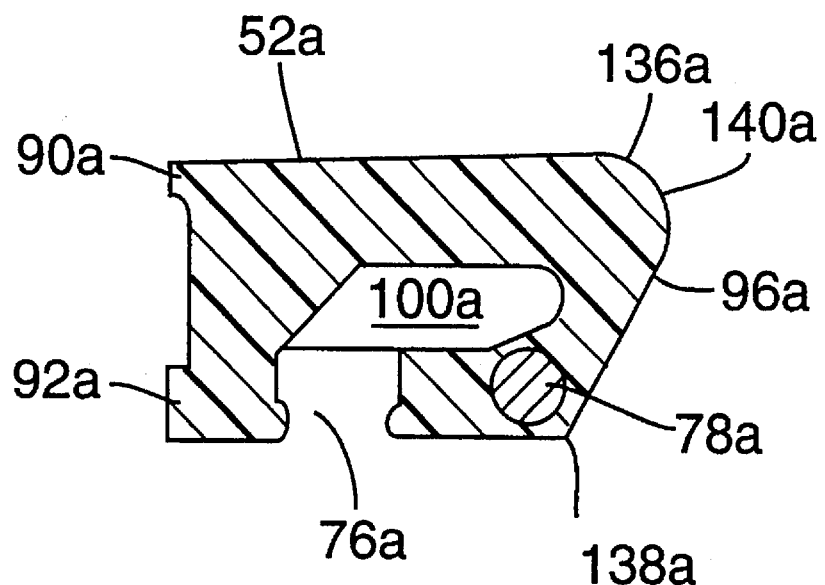
FIGS. 7A and 7B are enlarged sectional side elevations of lower portions of, respectively, an elastomer sleeve as shown in FIGS. 1–6 and an alternative elastomer sleeve of the present invention.
Figure 7B:
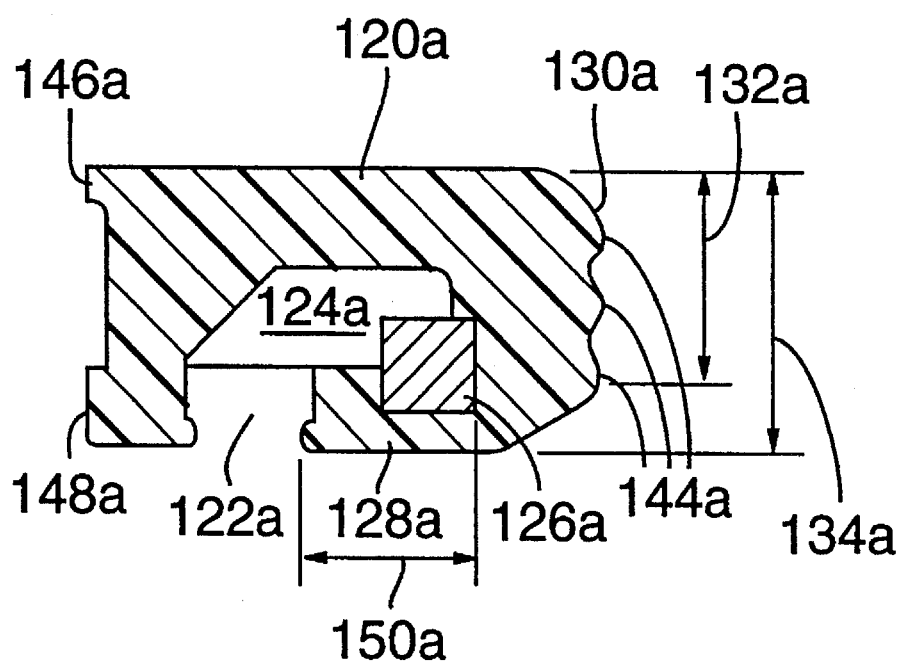

FIG. 7A is an enlarged sectional side elevation of a lower portion of elastomer sleeve 52a. FIG. 7B is an enlarged sectional side elevation of a lower portion of an alternative resilient, annular elastomer sleeve 120a of the present invention. Elastomer sleeve 120a is a substitute for elastomer sleeve 52a and is used with hub 54a in gate valve 10 in substantially the same manner. The following description is directed to elastomer sleeve 120a, but is similarly applicable to an elastomer sleeve 120b (not shown) that would be used with hub 54b.

Referring to elastomer sleeve 120a in FIG. 7B and hub 54a in FIG. 4A, elastomer sleeve 120a includes an endless radially inward recess 122a that receives radially inwardly projecting ridge 66a of hub 54a. Multiple angularly spaced cavities 124a (only one shown) extend radially inward from recess 122a and are of a configuration and number similar to those of cavities 100a of elastomer sleeve 52a. A metal retaining ring 126a is partly set in sleeve 120a in a rim segment 128a and otherwise is exposed to cavities 124a. Rim segment 128a engages face 68a and an adjacent axially inward ledge 82a of hub 54a.

Retaining ring 126a has a rectangular, preferably square, cross section and may be formed from plate or sheet metal by stamping or machining, but preferably is formed from plate or sheet (i.e., flat) metal by laser or abrasive water jet cutting. Laser or abrasive water jet cutting, referred to generally as directed-stream cutting, of flat metal forms retaining ring 126a with improved roundness and flatness compared to stamping or machining plate or sheet metal or rolling and welding heavy wire. Moreover, directed-stream cutting allows retaining ring 126a to be formed in non-circular shapes (e.g., rectangular) according different valve applications. Retaining ring 126a is preferably of mild steel because of low cost and superior adhesion to sleeve 120a, but could alternatively be of stainless steel for use in a corrosive environment.

The improved roundness and particularly flatness of retaining ring 126a provided by directed-stream cutting facilitates the proper embedding of retaining ring 126a in sleeve 120a. A retaining ring formed by stamping or machining plate or sheet metal or rolling and welding heavy wire is seldom flat and is therefore difficult to set properly in the mold for an elastomer sleeve. It is believed that forming a retaining ring by stamping or machining plate or sheet metal subjects the metal to excessive forces or heat, which distort the ring flatness. It is believed that a retaining ring formed by rolling and welding heavy wire is not flat because the ring is inherently nonuniform about its circumference.

An axially inwardly projecting major lip 130a has a thickness 132a that is between 70% and 80%, preferably about 75%, the thickness 134a of elastomer sleeve 120a. Major lip 130a extends under compression to valve centerline 98 (FIG. 4A), similar to major lip 96a of elastomer sleeve 52a. In contrast, major lip 96a of elastomer sleeve 52a includes radially inner and outer edges 136a and 138a, respectively, and an axially innermost extent 140a adjacent radially inner edge 136a. Lip section 96a axially recedes as it extends toward radially outer edge 138a.

Major lip 130a includes multiple undulations 144a that cooperate to provide a wider sealing face for engaging and compressing against peripheral margins 102a (FIG. 4B) of gate 16 whenever it occludes passageway 20. Elastomer sleeve 120a with major lip 130a and undulations 144a is capable of forming a seal against gate 16 at higher temperatures and higher pressures than is elastomer sleeve 52a with major lip 96a.

More specifically, major lips 96a and 96b can sometimes be misaligned with each other when gate 16 is moved to open or close valve 10, thereby causing seal unit 49 to leak. For example, gate 16 moving to close valve 10 can push one of major lips 96a and 96b out of alignment with the other along the lower portion of valve 10, particularly if pressure in passageway 20 bears against gate 16 and one of elastomer sleeves 52a or 52b. Although an adequate seal could be maintained while valve 10 is closed, a leak could result when gate 16 is moved from between the misaligned major lips 96a and 96b.

Undulations 144a provide elastomer sleeve 120a with an enlarged sealing area over which the pressure for sealing against gate 16 is distributed. As a result, opposed elastomer sleeves 120 can form a seal against gate 16 with a wider range of pressures against it than elastomer sleeves 52, thereby decreasing the tendency for sleeves 120 to misalign. Thicknesses 132 and undulations 144 of projecting major lips 130 allow them to seal against each other even when they are misaligned due to movement of gate 16.

Moreover, these benefits of undulations 144a allow elastomer sleeve 120a to be formed with materials having a wider range of characteristics than those for sleeves 52. For example, elastomer sleeves 52 would preferably have hardnesses of 67–69 Durometer for 2–12 inch (5–30 cm) valves, whereas elastomer sleeves 120 could preferably have corresponding hardnesses of 65–70 Durometer.

Other than the features specified above, elastomer sleeve 120a has substantially the same features and characteristics as elastomer sleeve 52a. For example, a pair of axially outwardly projecting annular ridges 146a and 148a function as a gasket for engaging a flange surface 94a of conduit 14a to hold sleeve 120a in place and provide a seal between conduit 14a and body half 40a. Rim segment 128a has a large thickness 150a that allows rim segment 128a to be compressed by relatively large amounts. Also, the hardness of elastomer sleeve 120a is selected according to the same guidelines as elastomer sleeve 52a.

It will be obvious to those having skill in the art that many changes may be made in the above-described details of a preferred embodiment of the present invention without departing from the underlying principles thereof. The scope of the invention should, therefore, be determined only by the following claims.

We claim:

1. An annular seal unit for use in a gate valve in which a gate is operable to slide into lateral contact with the seal unit to close the valve, the seal unit being radially disposed about a central axis and having an axial midpoint and an axially lateral gate-engaging side displaced in a first axial direction from the axial midpoint of the seal unit, comprising:

a radially exterior, substantially rigid annular hub including an inwardly directed flange; and a radially interior, annular, resilient elastomer sleeve integrally supported by the hub and including:

a continuous lip section facing outwardly in the first axial direction along the gate-engaging side of the seal unit for engaging a side of and forming a seal against the gate, a radially inward recess within a radially outward facing surface of the sleeve for receiving and being supported by the inwardly directed flange of the hub, a plurality of angularly spaced cavities that extend radially inward from the inward recess, and a substantially rigid ring molded within and encircling the sleeve.

2. The annular seal unit of claim 1 in which the substantially rigid ring has a rectangular cross section.

3. The annular seal unit of claim 2 in which the substantially rigid ring has a square cross section.

4. The annular seal unit of claim 1 in which the lip section of the sleeve extends furthest outward in the first axial direction relatively near to its innermost radial extent and therefrom recedes inwardly counter to the first axial direction as it extends toward its outermost radial extent.

5. The annular seal unit of claim 1 in which the lip section of the sleeve has a thickness of at least 70% that of the sleeve.

6. The annular seal unit of claim 1 in which the lip section includes a surface facing axially outward in the first axial direction and having plural undulations.

7. The annular seal unit of claim 1 in which the substantially rigid ring is exposed within each of the cavities.

8. The annular seal unit of claim 1 in which each of the cavities in the elastomer sleeve has a radially inward portion and is formed so that it extends furthest in the first axial direction in the radially inward portion of the cavity.

9. The annular seal unit of claim 1 further including a conduit-engaging side axially opposed to the gate-engaging side, the sleeve further including a continuous ridge projecting outwardly along the conduit-engaging side to form a gasket for the conduit.

10. The annular seal unit of claim 1 wherein the sleeve includes a continuous lip section having an axially outward facing surface along the gate-engaging side of the seal unit, the lip section having plural undulations for engaging a side of and forming a seal against the gate, plurality of angularly spaced cavities that extend radially inward from a radially outward facing surface of the sleeve, and a substantially rigid ring molded within the sleeve.

11. An annular, resilient elastomer sleeve for use in a seal unit of a gate valve wherein a gate is operable to slide into lateral contact with the sleeve to close the valve, the sleeve being radially disposed about a central axis and having an axial midpoint and an axially lateral gate-engaging side displaced in a first axial direction from the axial midpoint of the sleeve comprising:

a continuous lip section facing outwardly in the first axial direction along the gate-engaging side of the seal unit for engaging a side of and forming a seal against the gate;

a radially inward recess within a radially outward facing surface of the sleeve for receiving and being supported by a portion of the seal unit;

a plurality of angularly spaced cavities that extend radially inward from the inward recess; and a substantially rigid ring molded within and encircling the sleeve.

12. The sleeve claim 11 in which the lip section has a thickness of at least 70% that of the entire sleeve.

13. The sleeve of claim 11 in which the rigid ring has a rectangular cross section.

14. The sleeve of claim 11 in which the rigid ring has a square cross section.

15. The sleeve of claim 11 in which the rigid ring is exposed within each of the cavities.

16. The annular sleeve unit of claim 11 in which the lip section of the sleeve extends furthest outward in the first axial direction relatively near to its innermost radial extent and therefrom recedes inwardly counter to the first axial direction as it extends toward its outermost radial extent.

* * * * *